United States Patent [19]
Perkins

[11] Patent Number: 5,794,646
[45] Date of Patent: Aug. 18, 1998

[54] AIR RELEASE VALVE

[75] Inventor: Lee A. Perkins, Lowden, Wash.

[73] Assignee: Nelson Irrigation Corporation, Walla Walla, Wash.

[21] Appl. No.: 828,509

[22] Filed: Mar. 31, 1997

[51] Int. Cl.$^6$ .................................................. F16K 24/04
[52] U.S. Cl. .................................................. 137/202; 251/901
[58] Field of Search ........................... 137/202; 251/901

[56] References Cited

U.S. PATENT DOCUMENTS

| | | |
|---|---|---|
| 1,576,709 | 3/1926 | Bassler . |
| 2,449,573 | 9/1948 | White . |
| 2,977,972 | 4/1961 | Billeter et al. ............................ 137/202 |
| 3,000,395 | 9/1961 | Waterfill . |
| 3,021,861 | 2/1962 | Billeter et al. . |
| 3,049,146 | 8/1962 | Hayes . |
| 3,053,275 | 9/1962 | Waterfill . |
| 3,154,091 | 10/1964 | Richards et al. . |
| 3,230,965 | 1/1966 | Richards . |
| 3,230,966 | 1/1966 | Richards . |
| 3,236,493 | 2/1966 | Richards . |
| 3,259,142 | 7/1966 | Richards . |
| 3,282,288 | 11/1966 | Sheppard . |
| 3,437,104 | 4/1969 | Richards . |
| 3,741,234 | 6/1973 | Siebold . |
| 3,766,933 | 10/1973 | Nicholson, Jr. . |
| 3,771,563 | 11/1973 | Hayner . |
| 3,794,068 | 2/1974 | Milroy . |
| 3,905,576 | 9/1975 | Fox, Jr. . |
| 3,951,168 | 4/1976 | Roberts . |
| 3,973,582 | 8/1976 | Siebold . |
| 4,082,106 | 4/1978 | Butcher . |
| 4,092,998 | 6/1978 | Taplin . |
| 4,104,004 | 8/1978 | Graef ....................................... 137/202 X |
| 4,106,524 | 8/1978 | Wunsch .................................. 137/202 X |
| 4,484,728 | 11/1984 | Moore . |
| 4,488,702 | 12/1984 | Lapeyre . |
| 4,770,201 | 9/1988 | Zakai . |
| 5,020,567 | 6/1991 | Proulx . |
| 5,090,443 | 2/1992 | Jacobsen . |
| 5,313,977 | 5/1994 | Bergsma et al. . |
| 5,368,276 | 11/1994 | Pfeiffer . |
| 5,605,175 | 2/1997 | Bergsma et al. ............................ 137/202 |

FOREIGN PATENT DOCUMENTS

| | | | |
|---|---|---|---|
| 0724098 | 7/1996 | European Pat. Off. .............. 137/202 |
| 957920 | 2/1957 | Germany ................................. 137/202 |

*Primary Examiner*—Gerald A. Michalsky
*Attorney, Agent, or Firm*—Nixon & Vanderhye P.C.

[57] ABSTRACT

An air release valve includes a housing having a fluid inlet and a fluid outlet, a valve plate within the housing between the inlet and outlet, the valve plate having a pair of discrete apertures isolated from each other; a valve seal assembly including a seal engageable with the valve plate overlying the apertures; a float located in the housing upstream of the valve plate and connected to the seal, the float displaceable between first and second positions in the housing wherein displacement of the float in one direction progressively detaches successive portions of the seal from the apertures, the float having a tapered end remote from the seal, the tapered end movable into a tapered internal inlet when the float moves to the second position.

11 Claims, 5 Drawing Sheets

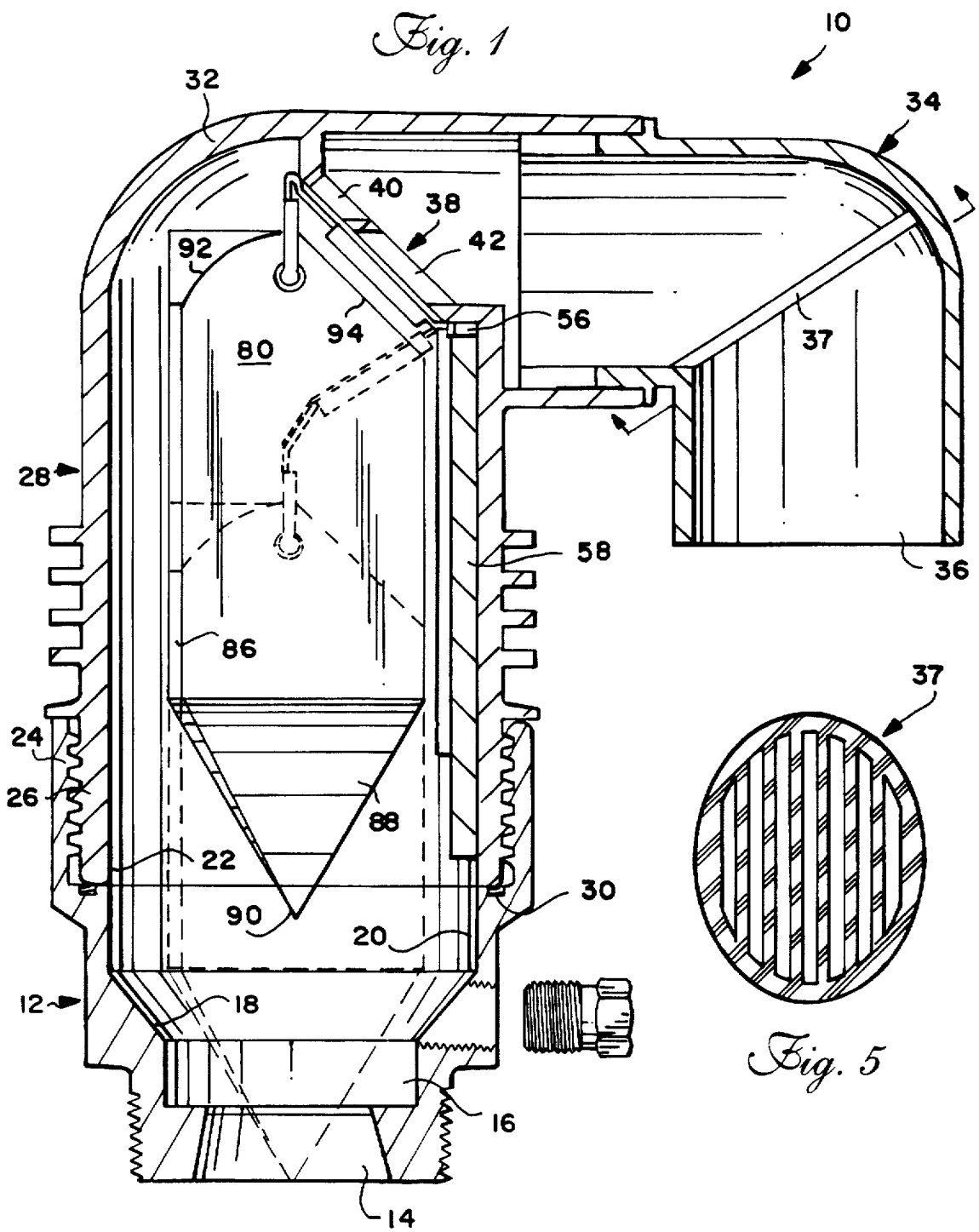

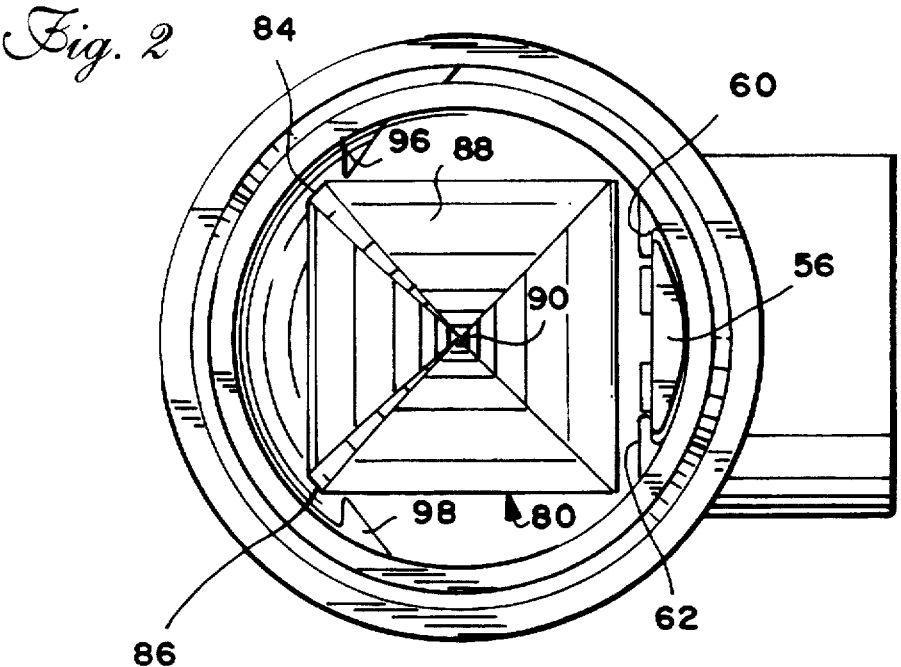
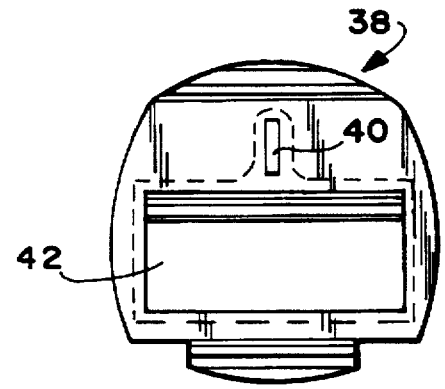
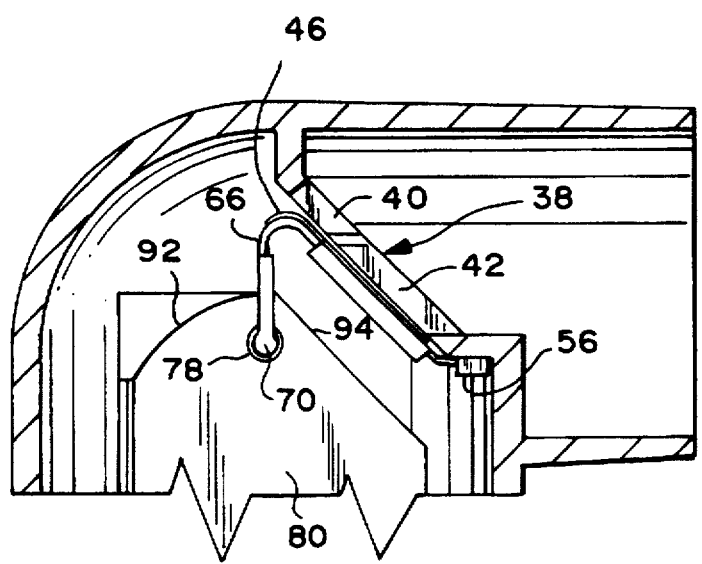

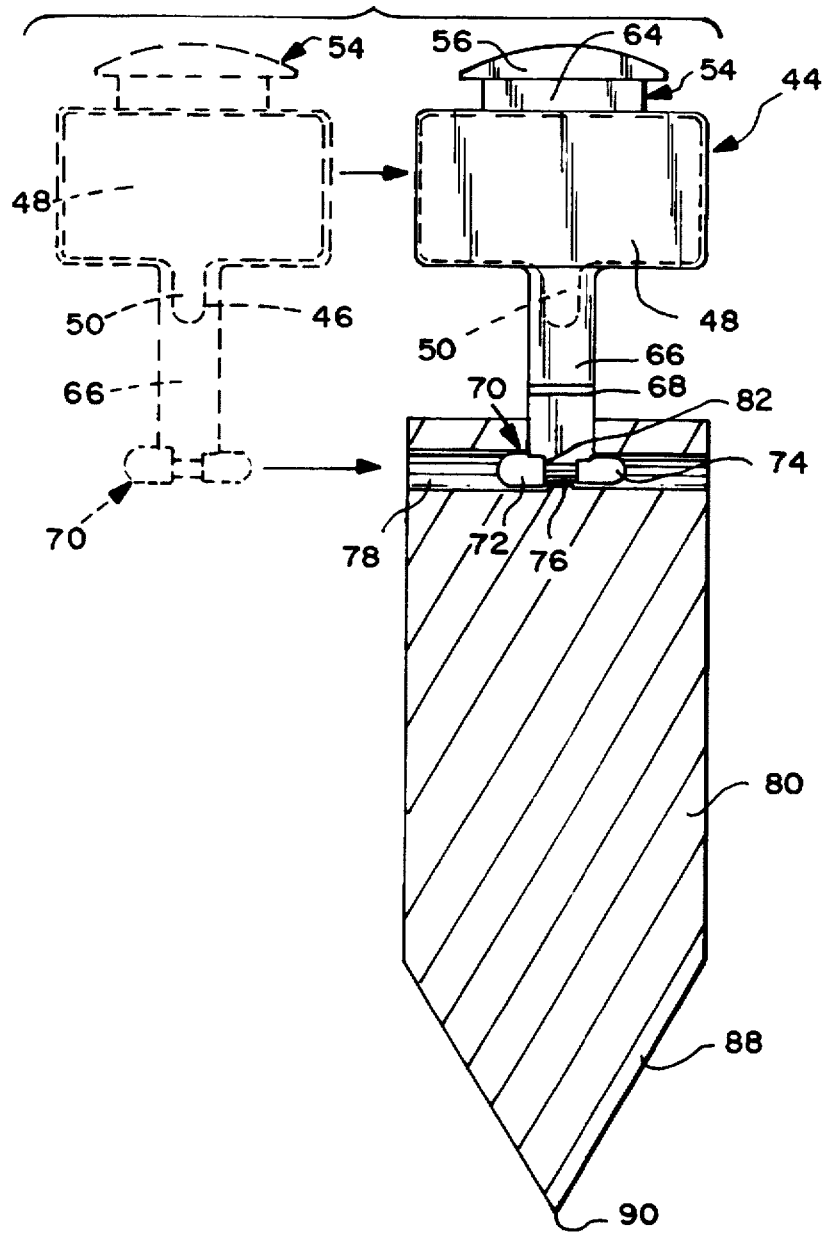
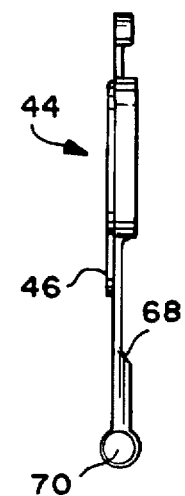
Fig. 3
Fig. 3A
Fig. 3B

AIR RELEASE VALVE

TECHNICAL FIELD

This invention relates generally to fluid flow valves, and particularly to fluid flow valves which incorporate an air release or purge mechanism for removing air from a fluid conduit on start-up and during normal flow conditions.

BACKGROUND

Fluid flow valves which include air release or air purge features are well known. These valves are generally located within liquid conduits and are designed to insure the release of air or other gases to avoid air locks which otherwise interfere with the flow of liquid through the conduit.

One known air purge valve construction is disclosed in U.S. Pat. No. 4,770,201. In that patent, a valve is provided which includes a housing having a defined fluid throughflow aperture, a valve seat formed in the housing and bounding the aperture; and a flexible closure membrane secured at one end of the housing and adapted to be biased under fluid pressure against the valve seat so as to seal the aperture. Membrane displacing means secured to an opposite end of the membrane results in progressive detachment of the membrane from the valve seat so as to open the aperture. Movement of the displacing means in an opposite direction allows the membrane to become sealingly biased against the valve seat. The displacing means comprises a float member located in the housing, movable between first and second positions adjacent the fluid inlet aperture.

In some of the known air purge type valves, it has been found that the valves tend to be "blown" closed by the velocity of the air escaping through the valve, thus significantly reducing their effectiveness. Attempts have been made to address this problem by designing floats with low aerodynamic drag coefficients. This change has been only partially successful in that the valves still tend to be blown closed at relatively low pressure differential across the valve (for example, less than 10 p.s.i.). Another approach has been to place a shield in the valve to direct the air around the float. Again, while this has been somewhat successful, the valve still blows closed when the pressure differential across the valve exceeds approximately 14 p.s.i. Moreover, additional components are required to implement this solution, thus increasing cost and complexity.

DISCLOSURE OF THE INVENTION

In accordance with an exemplary embodiment of this invention, an air release valve is provided which substantially overcomes the above stated problem in prior air release valves. In this invention, the air release valve includes a valve housing or riser adapted to be coupled to a fluid conduit. The housing includes an upstanding, substantially vertical portion and at least one 90° turn or elbow at the upper end of the housing. At the elbow, there is located a valve orifice plate arranged at an angle of about 45°, extending from the inside corner of the elbow upwardly to the outside corner of the elbow. The plate has a pair of separate apertures, a small slit-like aperture for continuous release of air, and a larger rectangular aperture for vacuum and start-up air release.

A seal assembly is provided for sealing the apertures in the valve plate, the seal assembly connected at one end to the lowermost end of the valve plate, and at its opposite end to a float device mounted for vertical movement within the housing, upstream of the valve plate. The seal assembly includes a rubber plate which is adapted to cover both openings or apertures in the valve plate, with a narrow, flexible tongue-like portion for covering the smaller slit-like aperture and a larger, reinforced rectangular portion for covering the larger aperture. The larger portion of the seal plate is reinforced by a steel insert molded within the rubber plate. As a result, the flexible tongue-like portion of the seal peels away from the slit-like aperture as the float descends within the housing, while the reinforced portion of the seal simply pivots away from the larger aperture.

The float itself has a generally square cross-section, cooperating with longitudinal ribs on the interior wall of the round housing to minimize friction, prevent rotation of the float, and to maximize the space between the float and the housing. The lower portion of the float is also provided with a tapered end (about 60° in the exemplary embodiment) which cooperates with the valve inlet geometry of the housing which is provided with about a 20° tapered inlet that ends in an abrupt radial expansion similar to a truncated Laval nozzle, as explained further herein.

The 20° tapered nozzle and the 60° tapered float combination proved to be optimal for this particular valve configuration, but other combinations could be found that would work well with different valve designs.

Accordingly, in its broader aspects, the invention relates to an air release valve comprising a housing having a fluid inlet and a fluid outlet, a valve plate within the housing between the inlet and outlet, the valve plate having a pair of discrete apertures isolated from each other; a valve seal assembly including a seal engageable with the valve plate overlying the apertures; a float located in the housing upstream of the valve plate and connected to the seal, the float displaceable between first and second positions wherein displacement of the float in one direction progressively detaches successive portions of the seal from the apertures, the float having a tapered end remote from the seal, the tapered end movable into a tapered internal seat area adjacent the inlet when the float moves to the second position.

In another aspect, the invention relates to an air release valve comprising a housing having a fluid inlet and a fluid outlet, a valve plate within the housing between the inlet and outlet, the valve plate having a pair of discrete apertures isolated from each other; a valve seal assembly including a seal engageable with the valve plate overlying the apertures; a float located in the housing upstream of the valve plate and connected to the seal, the float displaceable between first and second positions in the housing wherein displacement of the float in one direction progressively detaches successive portions of the seal from the apertures, the float having surface means for minimizing friction on contact of the float with the housing.

Other objects and advantages of the invention will become apparent from the detailed description which follows.

BRIEF DESCRIPTION OF THE DRAWINGS

FIG. 1 is a side elevation, partly in section, illustrating an air release valve in accordance with an exemplary embodiment of the invention;

FIG. 2 is a bottom plan view of the air release valve shown in FIG. 1;

FIG. 3 is an elevation, partly in section, of a seal valve assembly and float incorporated in the air release valve shown in FIG. 1, and illustrating the manner of assembly of the seal valve to the float;

FIG. 3A is a side elevation of the seal assembly component;

FIG. 3B is an enlarged detail taken from FIG. 3A;

FIG. 4 is a front elevation of the valve orifice plate used in the air release valve shown in FIG. 1;

FIG. 5 is a partial elevation, partly in section, illustrating the seal valve assembly in a partly open condition;

FIG. 6 is a partial section similar to FIG. 1 but illustrating the manner in which the seal begins to open when air enters the valve.

BEST MODE FOR CARRYING OUT THE INVENTION

Figure 7:
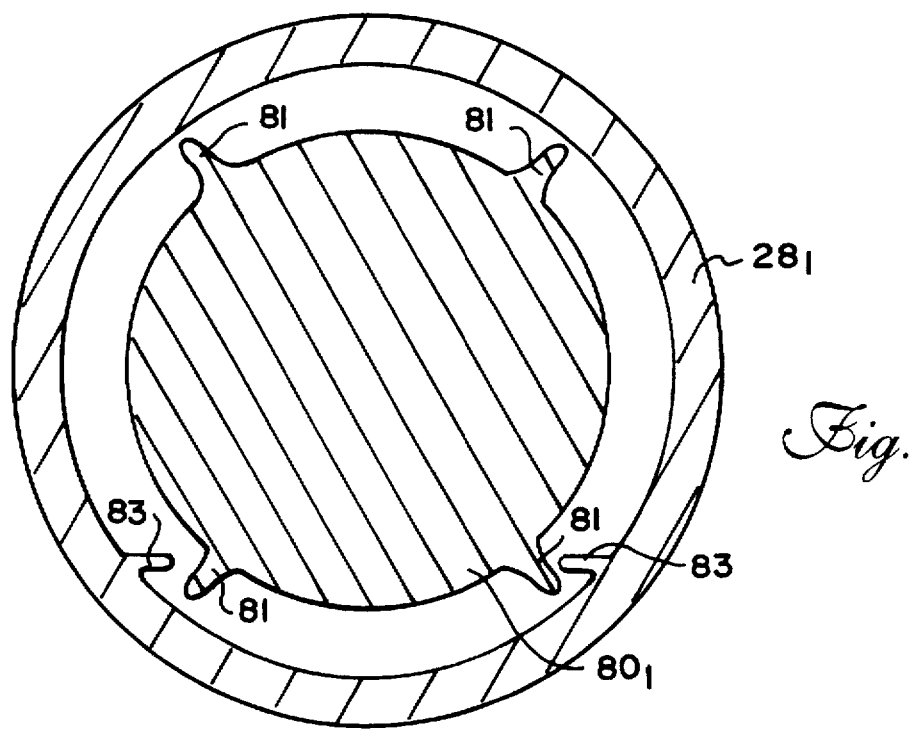
FIGS. 7-9 illustrate various cross sectional shapes for the float member and corresponding elements on the housing which minimize friction between the float and the housing and which prevent rotation of the float in accordance with alternative embodiments of the invention.

Referring to FIG. 1, the air release valve 10 includes a base 12 which includes an inlet 14 having an expansion portion 16, a tapered seat portion 18 and a smooth internal, cylindrical portion 20. Downstream of cylindrical portion 20 is a radial shoulder 22 and an upstanding, interiorly threaded connector portion 24. The connector portion 24 threadably receives the lower cylindrical end 26 of a valve housing 28. This end 26 is exteriorly threaded for mating threaded engagement with the connector portion 24 of the base 12, such that the lower edge of the housing abuts the radial shoulder 22, with an annular O-ring 30 sealing the joint interface.

The housing 26 extends vertically upwardly to a 90° elbow 32 which, in turn, connects to a second outlet elbow 34 including an outlet opening 36. The outlet 36 includes a protective screen 37 (FIG. 5) which keeps debris and pests from the operating components of the valve. At the upper end of the housing within the first elbow 32, there is an internal valve orifice plate 38 (see also FIG. 4) is formed with a pair of discrete apertures 40, 42. Aperture 40 comprises a relatively small slit (see FIG. 4), while aperture 42 is in the form of a relatively large rectangular opening. The valve plate 38 extends angularly across the flow path, at about a 45° angle, from an inside corner of the elbow upwardly to an outside corner of the elbow. The openings 40, 42 are isolated from each other, i.e., one does not directly communicate with the other, as best seen in FIG. 4.

A seal assembly 44 is configured to cover the apertures 40, 42 when the valve is closed. The seal assembly 44 comprises essentially a one-piece rubber body or plate with a steel insert as further described below. The sealing portion is "outlined" by a raised bead 46 which defines a larger rectangular seal portion 48 and a narrow tongue-like seal portion 50, adapted to cover apertures 42, 40, respectively. The rectangular portion 48 is reinforced by a rigid stainless steel plate 52 which is embedded within the rubber body, i.e., the plate is placed in the seal assembly mold and the rubber body is formed about the plate.

A housing mounting flange 54 extends from one side of the rectangular portion 48 remote from the tongue portion 50. This flange mounts the seal assembly 44 to the interior of the housing 28, adjacent the lower end of the valve orifice plate 38. The curved free end 56 of the flange 54 is captured there by a curved retainer plate 58 slidably mounted in the housing 26 between vertically extending ribs 60, 62 (see FIG. 2). The remaining portion 64 of the flange 54 serves as a hinge for the seal portions 48, 50 as described further below (see also FIG. 6). Note that the curvature of the plate 58 may be slightly larger than the curvature of the housing 58 so that the plate 58 will be retained between the ribs 60, 62 in the desired vertical location by friction. Extending in the opposite direction from flange 54 is a float mounting strap or web 66, and note that the tongue portion 50 of the seal extends into this web area, as best seen in FIGS. 3 and 3A. Strap portion 66 is of reduced thickness throughout most of its length, with a thickened portion beginning at edge 68 and extending to a transverse "pin" 70.

The latter is formed with enlarged end portions 72, 74 separated by a smaller diameter portion 76. The "pin" may be slidably inserted in a slot 78 formed across the top of the float 80 (from left to right as viewed in FIG. 2), so that the smaller of the enlarged ends can be pushed past the reduced diameter neck 82 and snapped into place as shown in FIG. 3. In this way, the thickened portion of strap 66 is effectively captured in the slot 78. The seal assembly is thus movable between open and closed positions vis-a-vis valve plate 38 in response to movement of the float 80.

The float 80 is substantially square in cross section as best seen in FIG. 3, but with a pair of beveled edges 84, 86. The lower part 88 of the float has an inverted pyramid shape, extending to a lowermost point 90. The sides of the pyramid taper inwardly and define included angles of about 60°.

The upper part of the float body is curved at one side 92, and has a flat truncated surface 94 on the opposite side, surface 94 adjacent and substantially parallel to the valve plate 38.

Vertical ribs 96, 98 are formed on the interior wall of the housing 26 across from the retaining ribs 60, 62. Ribs 96, 98 (in combination with the corners of the float opposite edges 84, 86) prevent rotation of the float within the housing 28 with minimal surface contact.

In use, and prior to the introduction of liquid into the conduit to which the valve 10 is secured (with the conduit running substantially perpendicular to the housing 28), the conduit as well as the valve 10 are filled with air. Under this condition, the float 80 is in its lowermost position as shown in dotted lines in FIG. 1, and with the apertures 40, 42 fully open. As water begins to flow through the conduit, the housing 28 will begin to fill with water and the float 80 will begin to rise. As the water level continues to rise, the float will rise only to the point where the larger opening 42 is closed by portion 48 of the seal assembly while any small amounts of air remaining in the system will escape from the smaller orifice 40. After all of the air has been removed, and with the housing 28 filled with water, the float will be at its highest position, with the seal assembly fully closing both apertures 40 and 42. During continued flow of liquid through the conduit, any small amounts of air which enter the system will rise to the top of the housing 28, causing the float 80 to drop slightly with the tongue portion of the seal 50 peeling away from the aperture 40 as shown in FIG. 6. Under normal conditions, the larger orifice 42 will not be opened until the fluid pressure in the conduit drops to zero, causing the float 80 to drop to the dotted line configuration in FIG. 1. It is therefore important that the overall weight of the float and its specific gravity be adjusted to operate within an expected pressure range for the fluid within the conduit.

In accordance with this invention, the square shape of float 80 and the associated vertical ribs 96, 98 on the interior of the housing 28 prevent rotation of the float 80 and minimize surface friction between the housing and the float during movement of the latter. In other words, contact between the float 80 and the housing 28 is limited to point or line contact rather than to broad surface contact. Thus, areas where sediment may collect and cause the float to jam are eliminated. Further in this regard, the substantially square shape of the float 80 maximizes the area between the float and the housing that is available to pass both water and air.

Figure 8:
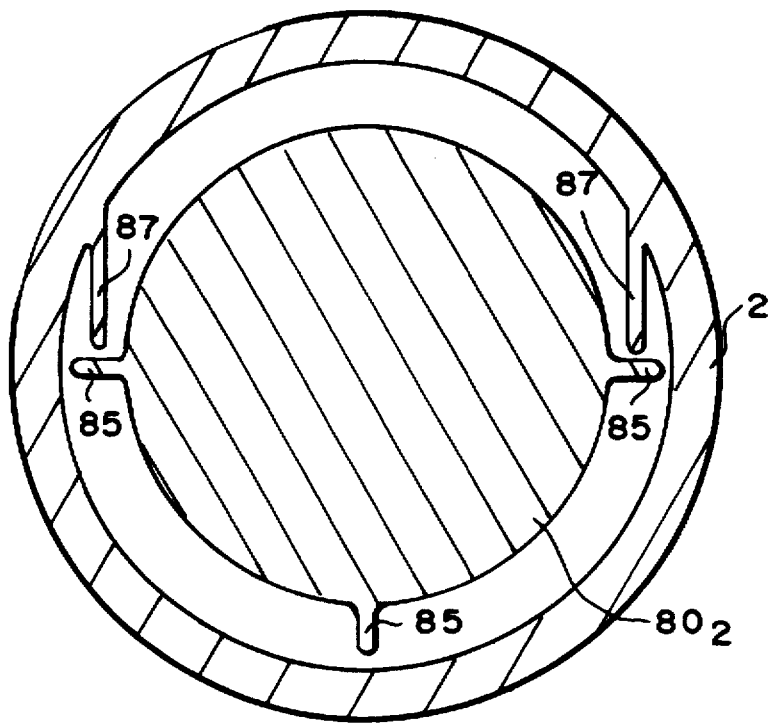

While the preferred float cross section is square, other shapes may be employed as well. For example, FIGS. 7 and 8 illustrate the use of floats $80_1$ and $80_2$, respectively, arranged generally concentrically within housings $28_1$ and $28_2$. The float $80_1$ is formed with four radially outwardly directed ribs 81 which minimize friction contact with the interior wall of the housing. At the same time internal ribs 83 formed on the internal housing wall interact with two of the ribs 81 on the float to prevent rotation of the float within the housing.

In the embodiment illustrated in FIG. 8, three ribs 85 on the float minimize friction with the housing wall while the two ribs 85 which are diametrically opposed also interact with ribs 87 on the internal housing wall to prevent rotation of the float within the housing.

Figure 9:
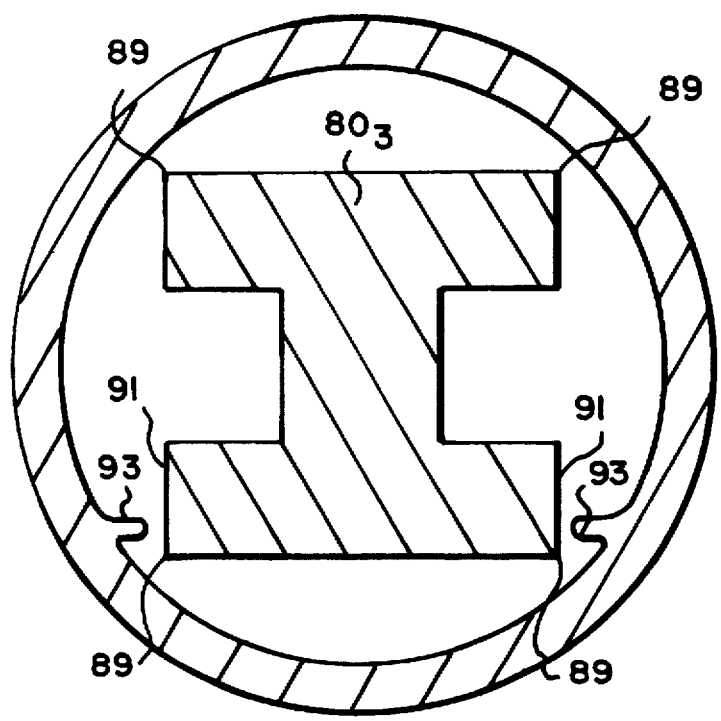

Turning now to FIG. 9, the float $80_3$ has a cross sectional shape similar to that of an I-beam. In this embodiment, the longitudinal side edges 89 of the float minimize frictional contact with the internal housing wall while surfaces 91 of the float interact with internal ribs 93 of the housing to prevent rotation of the float within the housing. It will be understood by those of ordinary skill in the art that other cross sectional shapes for the float along with cooperating structure on the internal wall of the housing may be employed to achieve the same purposes.

Returning to FIG. 1, the float design and the design of the inlet 14 is also significant in that it prevents the valve from being blown closed by the velocity of the air escaping through the valve orifice plate 38 and outlet 36. Thus, by adding the 60° taper to the bottom portion 88 of the square float 80, and by incorporating a valve inlet geometry which includes the 20° taper at the inlet section 14, an arrangement similar to a truncated Laval nozzle is simulated. A truncated nozzle is often used to regulate air flow. Specifically, a shock wave is formed across the throat of the "nozzle" or inlet 14 and chokes the nozzle. As the pressure differential across the inlet increases beyond the critical ratio, the mass flow of air remains the same. In this instance, the float 80 is positioned such that the tapered end 88 extends into the throat of the inlet when the valve is in its open position. While it has not been confirmed, it is believed that shock waves are also shed off the tapered end 88 of the float 80 when it is extended into the critical flow area of the inlet. This causes a low pressure region on the bottom of the float while a higher pressure region exists on the upper regions of the float. The net result is a downward force on the float 80 that tends to keep the seal assembly from being blown to a closed position, sealing the apertures 40, 42. In the embodiment illustrated herein, the valve is not blown closed until the pressure differential across the valve exceeds approximately 22 p.s.i. It should also be noted in this regard, that while either the tapered float or the tapered inlet by themselves provide some improvement in performance, significant improvements are not obtained unless both features are combined.

Further, while the 20° tapered nozzle and the 60° tapered float combination prove to be optimal for this particular valve configuration, other combinations may be equally viable with different valve designs.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An air release valve comprising a housing having a fluid inlet and a fluid outlet, a valve plate within said housing between the inlet and outlet, the valve plate having a pair of discrete apertures isolated from each other; a valve seal assembly including a seal engageable with said valve plate overlying said apertures; a float located in the housing upstream of the valve plate and connected to the seal, said float displaceable between first and second positions in said housing wherein displacement of the float in one direction progressively detaches successive portions of the seal from said apertures, said float having a tapered end remote from the seal, said tapered end movable into said inlet when said float moves to the second position, said inlet including a first portion tapering inwardly in a direction of fluid flow, a second expansion portion, and a third portion tapering outwardly in the direction of fluid flow, said second expansion portion located axially between said first and third portions.

2. The valve of claim 1 wherein said valve seal assembly comprises a rubber body with a rigid reinforcement plate embedded in an area of said rubber body which overlies a larger one of said pair of apertures.

3. The valve of claim 1 wherein said housing is round and said float is generally square in cross section, a lower end of said float tapering to a point.

4. The valve of claim 1 and including at least a pair of vertically extending ribs in said housing.

5. The valve of claim 1 wherein said valve seal assembly is retained in said housing by a plate slidably received within a pair of vertical retention ribs on an interior surface of the housing.

6. The valve of claim 1 wherein said tapered end of said float has about a 60° taper.

7. The valve of claim 6 wherein said first portion of said inlet has about a 20° taper.

8. The valve of claim 7 wherein said housing is round and said float is generally square in cross section.

9. The valve of claim 8 and including at least a pair of vertically extending ribs in said housing so that said float is precluded from rotating within said housing.

10. The valve of claim 1 wherein said first portion of said inlet has about a 20° taper.

11. The valve of claim 1 wherein said float has a substantially I-beam cross sectional shape.

* * * * *